July 26, 1960 — A. L. LIND — 2,946,961
PULSE COMPARATOR
Filed May 20, 1957
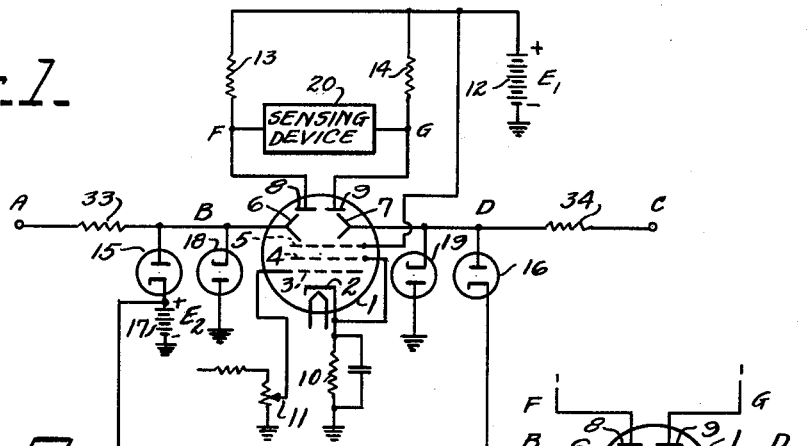
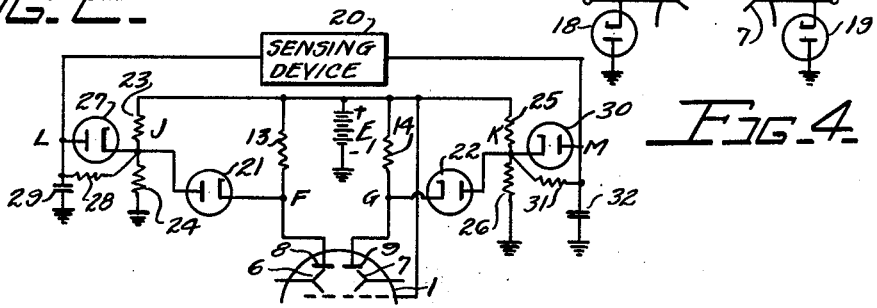
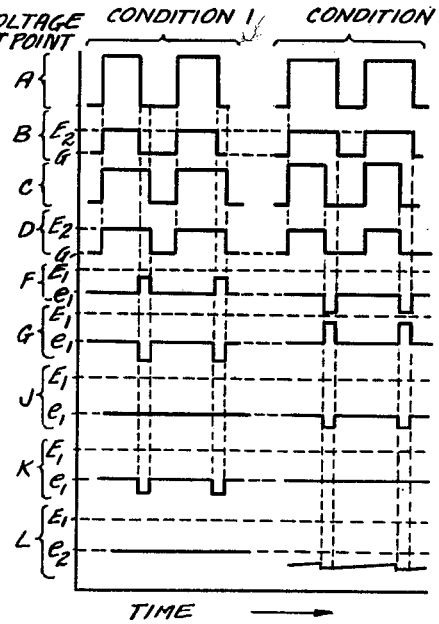
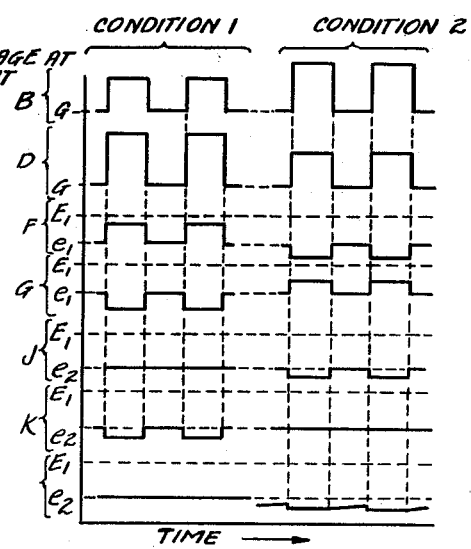
INVENTOR.
ARDEN L. LIND
BY
ATTORNEY
AGENT

United States Patent Office 2,946,961
Patented July 26, 1960

2,946,961

PULSE COMPARATOR

Arden L. Lind, New Brighton, Minn., assignor to the United States of America as represented by the Secretary of the Air Force Filed May 20, 1957, Ser. No. 660,432

6 Claims. (Cl. 328—146)

The purpose of this invention is to provide an electronic circuit which can be used for accurate matching of electrical pulse lengths or amplitudes in two pulse trains having the same pulse repetition rate.

The circuit employs an electron tube of the type having means for producing an electron beam, a pair of anodes and a pair of beam deflecting electrodes. The tube is designed so that the beam impinges equally on the two anodes when the potential difference between the deflecting electrodes is zero. When the deflection electrode potentials depart from equality, the beam is deflected toward the more positive electrode with a corresponding increase in beam current to one anode and an equal decrease in beam current to the other anode.

The pulse trains to be compared are each applied to one of the deflecting electrodes. If the comparison is to be on the basis of pulse length or duration, the pulses in the two trains must have coincident leading or trailing edges and must be clipped to the same amplitude before application to the deflection electrodes. If the pulses are of different durations, there will be a net unbalance in current flow to the anodes which can be detected by a suitable sensing device. If the comparison is on the basis of pulse amplitude, the pulses in the two trains must have coincident leading and trailing edges. Any difference in amplitude then results in a similar net unbalance in anode currents.

The advantage of a circuit of this type for a pulse comparison device is that the balance point depends only upon the electron beam trajectory within the tube. This trajectory depends upon physical spacings within the tube and not upon cathode emission or element voltages, excepting the deflection electrodes, and therefore changes in these factors cannot affect the accuracy of the comparator.

The invention will be described in more detail in connection with the specific embodiments thereof shown in the accompanying drawings in which:

Fig. 1 shows a comparator of pulse length or duration,

Fig. 2 shows a modification of Fig. 1 designed to eliminate the effects of noise, Fig. 3 gives waveform occurring in the circuits of Figs. 1 and 2, Fig. 4 illustrates the circuit arrangement when the comparison is on the basis of amplitude, and Fig. 5 shows waveforms occurring when the circuit operates on an amplitude comparison basis.

Referring to Fig. 1, electron tube 1 contains a cathode 2, beam forming and intensity control electrodes 3, 4 and 5, beam deflecting electrodes 6 and 7, and anodes 8 and 9. The tube is suitably biased by cathode resistor 10 and the intensity of the beam may be controlled by potentiometer 11. Positive potential from direct current source 12 is applied to the anodes through anode resistors 13 and 14. When electrodes 6 and 7 are at the same potential, the electron beam impinges equally on anodes 8 and 9, the currents through resistors 13 and 14 are equal and the voltages at points F and G are equal. If, for example, electrode 7 is made more positive than electrode 6, the beam is deflected to the right so that the current flow to anode 9 and in resistor 14 increases while the current to anode 8 and in resistor 13 decreases. This results in the potential of point F rising and that of point G falling so that F is at a greater potential than G. Deflection of the beam to the left by making electrode 6 positive in relation to electrode 7 has a similar but opposite effect. A suitable commercial tube of this type is the General Electric type 6AR8.

The circuit of Fig. 1 is used to compare pulses on the basis of length or duration. As already stated, for comparison on this basis either the leading or the trailing edges of the pulses in the two trains must be coincident and the pulse amplitudes must be equalized before application to the deflection electrodes. One pulse train is applied to terminal A and the other to terminal C. These are shown in Fig. 3 with their leading edges coincident and with the pulses at C of greater duration under condition 1 and of less duration under condition 2. Identical clipper circuits, comprising resistors 33 and 34, diodes 15 and 16 and direct current source 17, equalize the amplitudes of the pulses before application to the deflection electrode at a voltage value $E_2$. The pulse amplitudes, of course, must initially exceed this value. A predetermined equal reference voltage, in this case ground, is also established for the pulses applied to the deflecting electrodes by clamping diodes 18 and 19. The clipped and clamped pulse trains at points B and D are shown in Fig. 3.

It is apparent from Fig. 3, that under condition 1, during the interval between the trailing edge of the pulse at B and the trailing edge of the pulse at D, electrode 7 is positive relative to electrode 6 and more of the beam impinges on anode 9 than on anode 8. This results in a positive pulse at F and a negative pulse at G as shown in Fig. 3, $e_1$ being the quiescent voltage at F and G. Under condition 2, the conditions are interchanged so that a positive pulse appears at G and a negative pulse at F, as shown in Fig. 3. Any voltage and polarity sensing device 20 connected between points F and G and integrating over a period greater than the pulse repetition period will indicate F positive relative to G under condition 1 and G positive relative to F under condition 2.

The sensing device 20 in its simplest form may be a center-zero voltmeter or galvanometer. Any departure from equality of the pulse lengths in the two pulse trains being compared will cause a deflection of the needle from its center position, the direction of the deflection identifying the train having the longer pulses. In more complex forms the sensing device may be a polarized relay or polarity sensitive electronic circuit serving to control a servo system operating to adjust the length of the pulses in one train for automatically maintaining the pulse length equality.

In the circuit of Fig. 1, the presence of noise voltages in the signals applied to terminals A and C may cause spurious deflections of the electron beam in tube 1 and erratic and inaccurate operation of the sensing device 20. Fig. 2 shows a modification of Fig. 1 designed to eliminate the effects of noise. In this arrangement diodes 21 and 22 are biased by identical potential dividers 23—24 and 25—26 so that, in the quiescent state of the circuit (the electron beam impinging equally on anodes 8 and 9), the anode potentials of the diodes are below the cathode potentials by an amount at least equal to the maximum deviation of points F and G from their quiescent voltage ($e_1$) that is likely to occur as a result of noise potentials on the deflecting electrodes. The diodes therefore effectively prevent noise potentials at points F and G from being transmitted to points J and K. The amplitude of the compared pulses, however, is great enough to overcome the diode bias and produce signals at points J or K depending upon which of the pulse trains has the pulses of greater duration. The waveforms at these points under condition 1 and condition 2 are shown in Fig. 3, $e_2$ being the quescent voltage at points J and K established by the potential dividers 23—24 and 25–26.

Diode 27 and R-C circuit 28—29 permit point L to assume a lower average potential than point M under condition 2 (Fig. 3). This result is accomplished because, during the negative pulse at J, condenser 29 rapidly discharges through the low impedance of diode 27 dropping the potential at L to that of J. At the end of the negative pulse at J, the potential at J immediately rises to the quiescent value $e_2$ but the potential of L cannot follow because of the slow charging rate through resistor 28, and the small increment in charge that does occur between negative pulses is lost by discharge through the diode during the next negative pulse. Therefore, under condition 2, point L assumes a potential lower than the quiescent potential $e_2$ at J, as shown in Fig. 3. Since point M under these circumstances has a constant potential equal to the quescent potential $e_2$ at point K, a potential difference exists across sensing device 20 with terminal M positive. Diode 30 and R-C circuit 31—32 operate in the same manner to establish terminal M at a lower potential than terminal L under condition 1. The waveforms are simply those for L in Fig. 3 interchanged. The sensing device 20 should have an impedance sufficiently high to prevent any appreciable transfer of charge between condensers 29 and 32 during the intervals between pulses.

Fig. 4 shows the modification of Fig. 1, or Fig. 1 modified by Fig. 2, required to compare pulses on an amplitude basis. As already stated, this basis for comparison requires that the leading and trailing edges of the pulses in the two trains be coincident. As seen in Fig. 4, the clipping circuits are omitted, the pulse trains to be compared being applied directly to the deflecting electrodes through terminals B and D. The clamping diodes 18 and 19 are retained to establish a common reference potential, in this case ground, for the two wave trains. The operation of the circuit in other respects is similar to the operation for comparison on a pulse duration basis, except that the pulse durations at points F, G, J and K are constant under all conditions and equal to the durations of the pulses being compared rather than to the difference in their durations as in Fig. 3. The waveform occurring in the ten possible conditions of operation are shown in Fig. 5. As before, the waveforms at M are the same as those at L interchanged.

I claim:
1. Apparatus for comparing the electrical pulses of one pulse train with the electrical pulses of another synchronized pulse train of the same repetition rate, comprising: an electron tube having a pair of anodes, means including a cathode for producing a constant current beam of electrons normally impinging equally on the two anodes, and a pair of deflecting electrodes cooperating with said beams and acting in the presence of a potential difference therebetween to deflect said beam relative to said anodes so as to inversely vary the electron flow to said anodes; a source of direct current having its negative terminal connected to said cathode and its positive terminal connected to each of said anodes through separate anode impedances; means for applying one of said pulse trains between one of said deflecting electrodes and a point of reference potential; means for applying the other of said pulse trains between the other of said deflecting electrodes and said point of reference potential; and means for sensing a potential difference between said anodes.

2. Apparatus as claimed in claim 1 in which means are provided to clamp the potentials of said deflecting electrodes to said reference potential.

3. Apparatus as claimed in claim 2 in which means are provided for rendering said potential sensing means insensitive to potential differences below a predetermined value.

4. Apparatus as claimed in claim 1 in which means are provided to clamp the potentials of said deflecting electrodes to said reference potential, and in which means are provided for equalizing the amplitudes of the pulses applied to said deflecting electrodes.

5. Apparatus for comparing the electrical pulses of one pulse train with the electrical pulses of another synchronized pulse train of the same repetition rate, comprising: an electron tube having a pair of anodes, means including a cathode for producing a constant current beam of electrons normally impinging equally on the two anodes, and a pair of deflecting electrodes cooperating with said beams and acting in the presence of a potential difference therebetween to deflect said beam relative to said anodes so as to inversely vary the electron flow to said anodes; a source of direct current having its negative terminal connected to said cathode and its positive terminal connected through a pair of anode impedances to said anodes; means for applying one of said pulse trains between one of said deflecting electrodes and a point of reference potential; means for applying the other of said pulse trains between the other of said deflecting electrodes and said point of reference potential; a two-terminal potential amplitude and polarity sensing device; first and second diodes having their cathodes each connected to one of the two anodes of said electron tube; means biasing the anodes of said diodes negatively relative to the quiescent potentials of said electron tube anodes; a third diode having its cathode connected to the anode of said first diode and its anode connected to one terminal of said sensing device; a fourth diode having its cathode connected to the anode of said second diode and its anode connected to the other terminal of said sensing device; equal resistors connected in shunt to said third and fourth diodes; equal capacitors connected between the anodes of said third and fourth diodes and said point of reference potential; and means for clamping the potentials of said deflecting electrodes to said reference potential.

6. Apparatus as claimed in claim 5 in which means are provided for equalizing the amplitudes of the pulses applied to said deflecting electrodes.

References Cited in the file of this patent

UNITED STATES PATENTS

| 2,024,979 | Metcalf | Dec. 17, 1935 |
| 2,096,012 | Soller | Oct. 19, 1937 |
| 2,358,901 | Ziebolz | Sept. 26, 1944 |
| 2,500,807 | Jager et al. | Mar. 14, 1950 |
| 2,565,535 | Tykulsky | Aug. 28, 1951 |
| 2,685,647 | Pages et al. | Aug. 3, 1954 |
| 2,727,143 | Slutz | Dec. 13, 1955 |
| 2,737,584 | Hughes et al. | Mar. 6, 1956 |
| 2,829,302 | Tatham | Apr. 1, 1958 |

FOREIGN PATENTS

| 158,232 | Australia | Aug. 13, 1954 |